US011128424B2

(12) United States Patent
Zhang

(10) Patent No.: US 11,128,424 B2
(45) Date of Patent: Sep. 21, 2021

(54) UE SUPPORTING LOW-LATENCY WIRELESS COMMUNICATION, METHOD AND APPARATUS IN BASE STATION

(71) Applicant: SHANGHAI LANGBO COMMUNICATION TECHNOLOGY COMPANY LIMITED, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 16/653,136

(22) Filed: Oct. 15, 2019

(65) Prior Publication Data
US 2020/0044809 A1  Feb. 6, 2020

Related U.S. Application Data

(63) Continuation of application No. 15/916,213, filed on Mar. 8, 2018, now Pat. No. 10,484,157, which is a (Continued)

(30) Foreign Application Priority Data

Sep. 10, 2015 (CN) .......................... 201510574983.4

(51) Int. Cl.
*H04L 5/00* (2006.01)
(52) U.S. Cl.
CPC .......... *H04L 5/0051* (2013.01); *H04L 5/0007* (2013.01); *H04L 5/0048* (2013.01)
(58) Field of Classification Search
CPC . H04L 5/00; H04L 5/0048; H04L 1/18; H04L 1/00; H04L 5/0012; H04L 27/14;
(Continued)

(56) References Cited

U.S. PATENT DOCUMENTS 8,848,607 B2 * 9/2014 Wang ............... H04W 16/14
                                                    370/328
8,989,109 B2 * 3/2015 Sun ................. H04L 5/0023
                                                    370/329
(Continued)

FOREIGN PATENT DOCUMENTS

CN      101800993 A    8/2010
CN      102217348 A    10/2011
(Continued)

OTHER PUBLICATIONS

CN Search Report in Application No. 201510595508.5 dated Feb. 24, 2019.
(Continued)

*Primary Examiner* — Man U Phan
(74) *Attorney, Agent, or Firm* — Maschoff Brennan

(57) ABSTRACT

User Equipment (UE) supporting low-latency wireless communication methods, a method and an apparatus in a base station. In one embodiment, a UE receives a first signaling indicating whether the Reference Signal (RS) pattern of a target RS set is a first or second pattern in a second Long Term Evolution (LTE) timeslot. According to the indication of the first signaling, the target RS set and a second data are processed by a first operation in the second LTE. The target RS set includes P RSs, P being a positive integer, and the P RSs are respectively mapped to P antenna ports. The second data is transmitted by the P antenna ports. The second LTE timeslot is an LTE timeslot behind the first LTE timeslot and continuous with the first LTE timeslot. The first pattern is the RS pattern of the LTE downlink UE-specific Reference Signal (URS) in the LTE timeslot.

16 Claims, 9 Drawing Sheets

Related U.S. Application Data continuation-in-part of application No. PCT/CN2016/098267, filed on Sep. 7, 2016.

(58) Field of Classification Search
CPC ...... H04L 5/0053; H04W 72/04; H04W 8/02; H04W 72/12; H04W 72/0446; H04W 72/14; H04W 76/27; H04W 74/0833; H04W 76/28; H04W 76/11; H04W 72/005; H04W 4/06; H04W 72/0453; H04W 72/0406
USPC .......................................................... 370/330
See application file for complete search history.

(56) References Cited

U.S. PATENT DOCUMENTS

| | | | |
|---|---|---|---|
| 9,185,720 B2* | 11/2015 | Mantravadi | H04W 72/044 |
| 9,814,030 B2* | 11/2017 | Park | H04W 72/042 |
| 9,883,485 B2* | 1/2018 | Zhang | H04L 5/0051 |
| 10,085,252 B2* | 9/2018 | Wang | H04L 25/0226 |
| 10,243,639 B2* | 3/2019 | Kim | H04W 72/0413 |
| 10,243,713 B2* | 3/2019 | Chen | H04L 5/0051 |
| 10,250,367 B2* | 4/2019 | Kim | H04L 1/0643 |
| 10,397,941 B2* | 8/2019 | Lee | H04L 5/0082 |
| 10,397,946 B2* | 8/2019 | Lee | H04W 72/04 |
| 10,693,612 B2* | 6/2020 | Yum | H04L 5/0048 |
| 10,932,290 B2* | 2/2021 | Lee | H04W 48/12 |
| 10,938,533 B2* | 3/2021 | Kwak | H04L 5/005 |
| 2014/0198747 A1 | 7/2014 | Ouchi et al. | |
| 2016/0270072 A1* | 9/2016 | Andgart | H04W 8/02 |
| 2018/0132207 A1* | 5/2018 | Zhang | H04W 72/0446 |
| 2018/0262937 A1* | 9/2018 | Lee | H04W 36/0083 |
| 2018/0278291 A1* | 9/2018 | Liu | H04W 72/04 |
| 2019/0029029 A1* | 1/2019 | Ohtsuji | H04L 5/00 |
| 2019/0074936 A1* | 3/2019 | Lee | H04L 5/0048 |
| 2020/0015256 A1* | 1/2020 | Lee | H04W 72/14 |
| 2020/0068557 A1* | 2/2020 | Lee | H04W 16/32 |
| 2020/0228286 A1* | 7/2020 | Yum | H04L 1/1861 |

FOREIGN PATENT DOCUMENTS

| | | |
|---|---|---|
| CN | 102325119 A | 1/2012 |
| CN | 103096389 A | 5/2013 |
| CN | 103856310 A | 6/2014 |
| CN | 103944665 A | 7/2014 |
| CN | 104012138 A | 8/2014 |
| CN | 104539327 A | 4/2015 |
| CN | 104796232 A | 7/2015 |
| WO | 2008103658 A2 | 8/2008 |
| WO | 2012015218 A2 | 2/2012 |
| WO | 2014088195 A1 | 10/2013 |

OTHER PUBLICATIONS

CN Office Action in Application No. 201510595508.5 dated Mar. 5, 2019.
CN Granting Patent Right in Application No. 201510595508.5 dated Jun. 4, 2019.
1st Office Action in CN application No. 201910449013.X dated May 18, 2021.
1st Search Report in CN application No. 201910449013.X dated May 7, 2021.
3GPP TSG RAN WG1 Meeting #61-bis Ericsson Uplink DMRS Resource Configuration for Rel-10 dated Jul. 2, 2010.

* cited by examiner

the LTE uplink DMRS also has the same problem.

UE SUPPORTING LOW-LATENCY WIRELESS COMMUNICATION, METHOD AND APPARATUS IN BASE STATION

CROSS-REFERENCE TO RELATED APPLICATION

This application is a continuation of U.S. Pat. No. 10,484,157, filed Mar. 8, 2018 which is continuation-in-part of International Application No. PCT/CN2016/041706, filed on Sep. 7, 2016, and claims benefit to Chinese Patent Application No. CN 201510574983.4, filed on Sep. 10, 2015, all of which is hereby incorporated by reference for all purposes. The International Application was published in China on Mar. 16, 2017 as WO2017041706A1 under PCT Article 21 (2).

BACKGROUND

Technical Field

The disclosure relates to a transmission scheme in wireless communication systems, and in particular to a method and a device for low-latency transmission based on Long Term Evolution (LTE).

BACKGROUND

At the $3^{rd}$ Generation Partner Project (3GPP) Radio Access Network (RAN) #63 plenary session, the subject of reducing the delay of the LTE network was discussed. The delay of the LTE network includes air interface delay, signal processing delay, transmission delay between nodes, and the like. As the upgrade of wireless access networks and core networks, transmission delay is effectively reduced. As the application of new semiconductors with higher processing speed, the signal processing delay is significantly reduced.

In LTE, Transmission Time Interval (TTI) or subframe or Physical Resource Block (PRB) pair corresponds to one milli-second (ms) in time. One LTE subframe includes two timeslots, which are a first timeslot and a second timeslot respectively. A Physical Downlink Control Channel (PDCCH) occupies the former R Orthogonal Frequency Division Multiplexing (OFDM) symbols of a PRB pair; wherein R is a positive integer less than 5 and is configured by a Physical Control Format Indicator Channel (PCFICH). As for Frequency Division Duplex (FDD) LTE, a Hybrid Automatic Repeat request (HARQ) has a loopback time of 8 ms. Thus, a few HARQ repeats would result in dozens of milli-seconds of network delay. Therefore, reducing air interface delay becomes an effective means for reducing the LTE network delay. In order to reduce air interface delay, one intuitive method is to design a short TTI (less than 1ms) to replace existing LTE subframes.

For the short TTI, one problem to be studied is a DeModulation Reference Signal (DMRS) scheme. A traditional DMRS is embedded into a data, and a receiver estimates the parameter of a wireless channel using the correlation of the wireless channel in time domain and frequency domain. Taking the LTE downlink DMRS for example, a traditional LTE downlink DMRS includes a Cell specific Reference Signal (CRS), and an LTE downlink UE specific Reference Signal (URS). When the duration of the short TTI is less than or equal to one LTE timeslot (0.5 ms), current LTE downlink URSs distributed in two LTE timeslots no longer apply. The LTE uplink DMRS also has the same problem.

In view of the above problem, the disclosure provides a solution. It should be noted that embodiments in the User Equipment (UE) of this application and the characteristics in the embodiments may be applied to the base station if no conflict is caused, and vice versa. Further, the embodiments of this application and the characteristics in the embodiments may be mutually combined if no conflict is caused.

SUMMARY

In view of the DMRS scheme in short TTI, one intuitive method is to insert sufficient DMRSs into the short TTI. However, the inventor finds through study that the following problems exist in the the above intuitive method:

the short TTI generally is less than the coherence time of the wireless channel; inserting DMRSs into the TTI cannot make full use of the time coherence of the wireless channel, that is, the DMRS occupies too many resources and wastes the transmission efficiency; and the brand new DMRS scheme probably would damage the compatibility with current LTE equipment.

An improved scheme is to reuse the LTE DMRS scheme using a subframe as a unit even if the transmitted physical layer data only occupies one LTE timeslot or less time domain resources.

The above improved scheme can ensure the performance of channel estimation, and has better compatibility. However, one potential problem is that the receiver cannot start decoding the physical layer data until completely receiving all the DMRSs in the LTE subframe. This increases the air interface delay, and goes against the original intention of the short TTI.

The solution in the disclosure fully considers the above problem.

The disclosure provides a method in a UE (User Equipment) supporting low-latency wireless communication, wherein the method includes the following steps:

Step A: receiving a first signaling, the first signaling indicating at least one of the following:

first information: whether a target Reference Signal (RS) set is transmitted in a first LTE timeslot;

second information: whether the RS pattern of the target RS set is a first pattern or a second pattern in a second LTE timeslot;

Step B: according to the indication of the first signaling, processing the target RS set and a second data by a first operation in the second LTE timeslot.

Herein, the target RS set includes P RSs, P being a positive integer, and the P RSs are respectively mapped to P antenna ports. The second data is transmitted by the P antenna ports. The second LTE timeslot is an LTE timeslot that is behind the first LTE timeslot and continuous with the first LTE timeslot. The first operation is receiving and the first pattern is the RS pattern of the LTE downlink URS in the LTE timeslot, or the first operation is transmitting and the first pattern is the RS pattern of the LTE uplink DMRS in the LTE timeslot.

The essence of the first information is: allowing the receiver of the DMRS to estimate a wireless channel parameter for a short TTI according to the URS received in multiple short TTIs. In one embodiment, the equivalence description of the first information is whether the P antenna ports have a corresponding RS in the first LTE timeslot. In one embodiment, the equivalent description of the first information is whether the RS in the first LTE timeslot can be used to estimate the parameter of the wireless channel through which the second data passes.

The essence of the above second information is: the base station dynamically or semi-statically configures the RS pattern in the short TTI.

The above first information and second information can make full use of the time domain coherence of the channel, thereby improving the spectrum efficiency. In addition, in the above method, the receiver can use the DMRS before the short TTI, and does not use the DMRS behind the short TTI, thereby avoiding the increase of air interface delay. In the disclosure, the RS pattern refers to the time-frequency location of the RE occupied by the RS.

In one embodiment, the first signaling is a physical layer signaling.

In one embodiment, the first signaling is a higher layer signaling.

In one embodiment, the first operation is receiving, the second data occupies K1 OFDM symbols in the second LTE timeslot, the second LTE timeslot includes K2 OFDM symbols, K1 is a positive integer less than K2, and K2 is a positive integer.

In one embodiment, the first operation is transmitting, the second data occupies K3 Single Carrier-Frequency Division Multiplexing Access (SC-FDMA) symbols in the second LTE timeslot, the second LTE timeslot includes K4 SC-FDMA symbols, K3 is a positive integer less than K4, and K4 is a positive integer.

In one embodiment, the target RS set is UE specific, that is, the target RS set is configured through a UE-specific signaling.

In one embodiment, the first signaling includes scheduling information of the second data.

In one embodiment, the first operation is receiving, the first signaling is one of Downlink Control Information (DCI) formats {1,1A,1B,1C,1D,2,2A,2B,2C,2D}.

In one embodiment, the first operation is transmitting; the first signaling is one of DCI formats {0,4}.

In one embodiment, the first operation is receiving; the physical layer channel occupied by the second data is mapped to a Downlink Shared Channel (DL-SCH).

In one embodiment, the first operation is transmitting; the physical layer channel occupied by the second data is mapped to an Uplink Shared Channel (UL-SCH).

In one embodiment, the first LTE timeslot and the second LTE timeslot belong to the same LTE subframe.

In one embodiment, the first LTE timeslot and the second LTE timeslot belong to different LTE subframes.

In one embodiment, compared with the first pattern, the second pattern includes more Resource Elements (REs).

In one embodiment, the number of REs occupied by each RS is the same in the second pattern.

In one embodiment, the first signaling schedules the data transmission of the second LTE timeslot.

According to one aspect of the disclosure, the first operation is receiving and the second pattern is the RS pattern of the LTE downlink URS in the former 0.5 ms of a special subframe of a first configuration, or, the first operation is transmitting and the second pattern includes the second SC-FDMA symbol and the sixth SC-FDMA symbol in the second LTE timeslot.

According to one aspect of the disclosure, Step A further includes the following steps:

Step A1: processing the target RS set by the first operation in the first LTE timeslot.

Step B further includes the following steps:

Step B1: according to the target RS set received in the first LTE timeslot and the second LTE timeslot, estimating a parameter of a wireless channel through which the second data passes.

Herein, the first operation is receiving and the first information indicates that the target RS set is transmitted in the first LTE timeslot.

In one embodiment, the parameter of the wireless channel is Channel Impulse Response (CIR).

In one embodiment, the RS pattern of the RS set is the first pattern in the second LTE timeslot. In this embodiment, although the UE detects the DMRS only on the last two OFDM symbols in the second LTE timeslot, the UE can improve the channel estimation performance according to the DMRS in the first LTE timeslot.

According to one aspect of the disclosure, Step B further includes the following steps:

Step B2: according to the target RS set received in the second LTE timeslot, estimating a parameter of a wireless channel through which the second data passes.

Herein, the first operation is receiving, the first information indicates that the target RS set is not transmitted in the first LTE timeslot, or the second information indicates that the RS pattern of the target RS set is the second pattern in the second LTE timeslot.

When the first information indicates that the target RS set is not transmitted in the first LTE timeslot, the second pattern can ensure that the UE can obtain a satisfied channel estimation performance only using the DMRS in the second LTE timeslot.

According to one aspect of the disclosure, the target RS set includes the P LTE downlink URSs in the first LTE timeslot and the second LTE timeslot, or, the target RS set includes the P LTE uplink DMRSs in a first LTE subframe and a second LTE subframe.

In one embodiment, the LTE downlink URS mentioned above includes an RS pattern, an RS sequence and an Orthogonal Covering Code (OCC).

In one embodiment, the LTE uplink DMRS mentioned above includes an RS pattern, an RS sequence and an OCC.

The above aspect of the disclosure ensures that the target RS set can coexist with traditional LTE (uplink or downlink) DMRSs in the first LTE timeslot and the second LTE timeslot, that is, that is keeping orthogonality.

In one embodiment, the target RS set also occupies REs other than the RE of the P LTE downlink URSs in the first LTE timeslot.

According to one aspect of the disclosure, if the target RS set is transmitted in the first LTE timeslot, the RS pattern of the target RS set is the first pattern in the second LTE timeslot; otherwise, the RS pattern of the target RS set is the second pattern in the second LTE timeslot.

In the above aspect, the first information couples with the second information, thereby reducing the number of bits (in the first signaling) required to configure the first information and the second information.

In one embodiment, the first information and the second information are indicated by one bit in the first signaling.

In one embodiment, the RS pattern of the target RS is the second pattern in the first LTE subframe, and the RS pattern of the target RS is the first pattern in the second LTE subframe.

The disclosure provides a method in a base station supporting low-latency wireless communication, wherein the method includes the following steps:

Step A: transmitting a first signaling, the first signaling indicating at least one of the following:

first information: whether a target RS set is transmitted in a first LTE timeslot;

second information: whether the RS pattern of the target RS set is a first pattern or a second pattern in a second LTE timeslot;

Step B: according to the indication of the first signaling, processing the target RS set and a second data by a second operation in the second LTE timeslot.

Herein, the target RS set includes P RSs, P being a positive integer, and the P RSs are respectively mapped to P antenna ports. The second data is transmitted by the P antenna ports. The second LTE timeslot is an LTE timeslot that is behind the first LTE timeslot and continuous with the first LTE timeslot. The second operation is transmitting and the first pattern is the RS pattern of the LTE downlink URS in the LTE timeslot, or the second operation is receiving and the first pattern is the RS pattern of the LTE uplink DMRS in the LTE timeslot.

According to one aspect of the disclosure, the second operation is transmitting and the second pattern is the RS pattern of the LTE downlink URS in the former 0.5 ms of a special subframe of a first configuration, or, the second operation is receiving and the second pattern includes the second SC-FDMA symbol and the sixth SC-FDMA symbol in the second LTE timeslot.

According to one aspect of the disclosure, Step A further includes the following steps:

Step A1: processing the target RS set by the second operation in the first LTE timeslot.

Herein, the second operation is transmitting and the first information indicates that the target RS set is transmitted in the first LTE timeslot.

In one embodiment, Step B further includes the following steps:

Step B1: determining a modulation coding mode of the second data according to the following assumptions:

assuming that a target UE estimates a parameter of a wireless channel through which the second data passes according to the target RS set received in the first LTE timeslot and the second LTE timeslot.

The target UE is a receiving UE of the target RS set.

Specifically, according to one aspect of the disclosure, Step B further includes the following steps:

Step B2: determining a modulation coding mode of the second data according to the following assumptions:

a target UE estimates a parameter of a wireless channel through which the second data passes according to the target RS set received in the second LTE timeslot.

Herein, the second operation is transmitting, the first information indicates that the target RS set is not transmitted in the first LTE timeslot, or the second information indicates that the RS pattern of the target RS set is the second pattern in the second LTE timeslot. The target UE is a receiving UE of the target RS set.

According to one aspect of the disclosure, the target RS set includes the P LTE downlink URSs in the first LTE timeslot and the second LTE timeslot, or, the target RS set includes the P LTE uplink DMRSs in a first LTE subframe and a second LTE subframe.

According to one aspect of the disclosure, if the target RS set is transmitted in the first LTE timeslot, the RS pattern of the target RS set is the first pattern in the second LTE timeslot; otherwise, the RS pattern of the target RS set is the second pattern in the second LTE timeslot.

The disclosure provides a UE supporting low-latency wireless communication, wherein the UE includes the following modules:

a first module, which is configured to receive a first signaling, the first signaling indicating at least one of the following:

first information: whether a target RS set is transmitted in a first LTE timeslot;

second information: whether the RS pattern of the target RS set is a first pattern or a second pattern in a second LTE timeslot;

a second module, which is configured to process the target RS set and a second data by a first operation in the second LTE timeslot according to the indication of the first signaling.

Herein, the target RS set includes P RSs, P being a positive integer, and the P RSs are respectively mapped to P antenna ports. The second data is transmitted by the P antenna ports. The second LTE timeslot is an LTE timeslot that is behind the first LTE timeslot and continuous with the first LTE timeslot. The first operation is receiving and the first pattern is the RS pattern of the LTE downlink URS in the LTE timeslot, or the first operation is transmitting and the first pattern is the RS pattern of the LTE uplink DMRS in the LTE timeslot.

In one embodiment, in the above equipment, the first operation is receiving and the second pattern is the RS pattern of the LTE downlink URS in the former 0.5 ms of a special subframe of a first configuration, or, the first operation is transmitting and the second pattern includes the second SC-FDMA symbol and the sixth SC-FDMA symbol in the second LTE timeslot.

The disclosure provides a base station apparatus supporting low-latency wireless communication, wherein the apparatus includes the following modules:

a first module, which is configured to transmit a first signaling, the first signaling indicating at least one of the following:

first information: whether a target RS set is transmitted in a first LTE timeslot;

second information: whether the RS pattern of the target RS set is a first pattern or a second pattern in a second LTE timeslot;

a second module, which is configured to process the target RS set and a second data by a second operation in the second LTE timeslot according to the indication of the first signaling.

Herein, the target RS set includes P RSs, P being a positive integer, and the P RSs are respectively mapped to P antenna ports. The second data is transmitted by the P antenna ports. The second LTE timeslot is an LTE timeslot that is behind the first LTE timeslot and continuous with the first LTE timeslot. The second operation is transmitting and the first pattern is the RS pattern of the LTE downlink URS in the LTE timeslot, or the second operation is receiving and the first pattern is the RS pattern of the LTE uplink DMRS in the LTE timeslot.

In one embodiment, in the above apparatus, the second operation is transmitting and the second pattern is the RS pattern of the LTE downlink URS in the former 0.5 ms of a special subframe of a first configuration, or, the second operation is receiving and the second pattern includes the second SC-FDMA symbol and the sixth SC-FDMA symbol in the second LTE timeslot.

Compared with the existing technologies, the disclosure has technical advantages as follows:

the channel estimation performance of short TTI scenes is improved, and meanwhile the time-frequency resource occupied by the DMRS is reduced;

the air interface delay is reduced; and it is compatible with the existing LTE DMRS schemes.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the application and the characteristics of the embodiments may be arbitrarily combined if there is no conflict.

Embodiment 1

Figure 1:
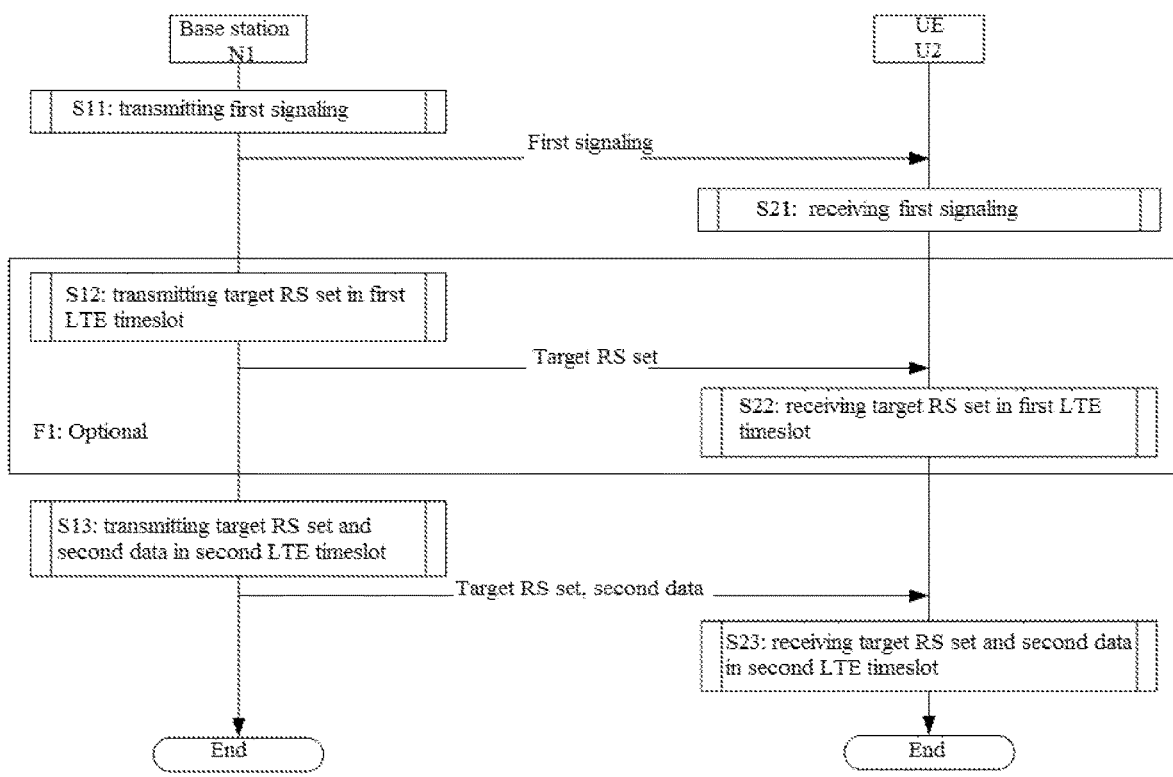
FIG. 1 is a flowchart illustrating downlink transmission according to one embodiment of the disclosure.

Embodiment 1 illustrates an example of a flowchart for downlink transmission, as shown in FIG. 1. In FIG. 1, the base station N1 is the maintenance base station of the serving cell of the UE U2; the steps identified in boxes F1 are optional steps.

For the base station N1, in S11, the base station N1 transmits a first signaling; the first signaling indicating at least one of the following:

first information: whether a target RS set is transmitted in a first LTE timeslot;

second information: whether the RS pattern of the target RS set is a first pattern or a second pattern in a second LTE timeslot.

In S13, according to the indication of the first signaling, the base station N1 transmits the target RS set and a second data in the second LTE timeslot.

For the UE U2, in S21, the UE U2 receives the first signaling, and, in S23, the UE U2 receives the target RS set and the second data in the second LTE timeslot.

In the Embodiment 1, the target RS set includes P RSs, P being a positive integer, and the P RSs are respectively mapped to P antenna ports. The second data is transmitted by the P antenna ports. The second LTE timeslot is an LTE timeslot that is behind the first LTE timeslot and continuous with the first LTE timeslot. The first pattern is the RS pattern of the LTE downlink URS in the LTE timeslot. The first signaling includes scheduling information of the second data.

In one embodiment of Embodiment 1, in S12, the base station N1 transmits the target RS set in the first LTE timeslot (that is, the target RS set is transmitted in both the first LTE timeslot and the second LTE timeslot), and, in S22, the UE U2 receives the target RS set in the first LTE timeslot. Herein, the first signaling indicates that the target RS set is transmitted in the first LTE timeslot. In one embodiment of Embodiment 1, in S23, the UE U2 estimates a parameter of a wireless channel through which the second data passes according to the target RS set received in the first LTE timeslot and the second LTE timeslot.

In one embodiment of Embodiment 1, the second data includes G transmission blocks, G being a positive integer.

In one embodiment of Embodiment 1, the first signaling is one of DCI formats{1,1A,1B,1C,1D,2,2A,2B,2C,2D}.

In one embodiment of Embodiment 1, the physical layer channel occupied by the second data is mapped to a DL-SCH.

Embodiment 2

Figure 2:
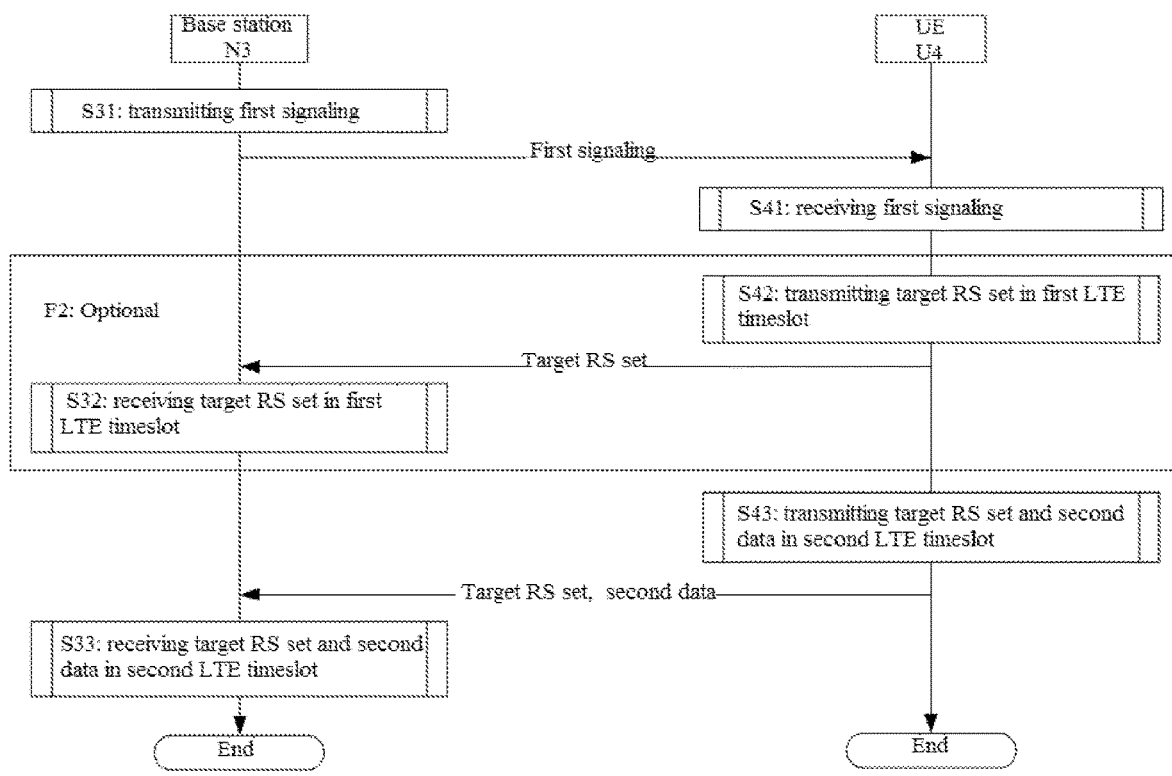
FIG. 2 is a flowchart illustrating uplink transmission according to one embodiment of the disclosure.

Embodiment 2 illustrates an example of a flowchart for uplink transmission, as shown in FIG. 2. In FIG. 2, the base station N3 is the maintenance base station of the serving cell of the UE U4; the steps identified in boxes F2 are optional steps.

For the base station N3, in S31, the base station N3 transmits a first signaling, the first signaling indicating the following:

second information: whether the RS pattern of a target RS set is a first pattern or a second pattern in a second LTE timeslot.

In S33, according to the indication of the first signaling, the base station N3 receives the target RS set and a second data in the second LTE timeslot.

For the UE U4, in S41, the UE U4 receives the first signaling, and, in S43, the UE U4 transmits the target RS set and the second data in the second LTE timeslot according to the indication of the first signaling.

In the Embodiment 2, the target RS set includes P RSs, P being a positive integer, and the P RSs are respectively mapped to P antenna ports. The second data is transmitted by the P antenna ports. The second LTE timeslot is an LTE timeslot that is behind the first LTE timeslot and continuous with the first LTE timeslot. The first pattern is the RS pattern of the LTE uplink DMRS in the LTE timeslot. The first signaling schedules the uplink transmission of the second data.

In one embodiment of Embodiment 2, in S42, the UE U4 transmits the target RS set in the first LTE timeslot, and, in S32, the base station N3 receives the target RS set in the first LTE timeslot. Herein, the first signaling indicates that the RS pattern of the target RS set is the first pattern in the second LTE timeslot. In one embodiment of Embodiment 2, in S33, the base station estimates a parameter of a wireless channel through which the second data passes according to the target RS set received in the first LTE timeslot and the second LTE timeslot.

In one embodiment of Embodiment 2, the steps identified in box F2 do not exist. The first signaling indicates that the RS pattern of the target RS set is the second pattern in the second LTE timeslot. In one embodiment of the sub-embodiment 2 of Embodiment 2, in S33, the base station estimates a parameter of a wireless channel through which the second data passes according to the target RS set received in the second LTE timeslot.

In one embodiment of Embodiment 2, the P RSs respectively are P LTE uplink DMRSs (that is, corresponding to P antenna ports) in the second LTE timeslot.

In one embodiment of Embodiment 2, the first signaling is one of DCI formats {0,4}.

In one embodiment of Embodiment 2, the physical layer channel occupied by the second data is mapped to an UL-SCH.

Embodiment 3

Figure 3:
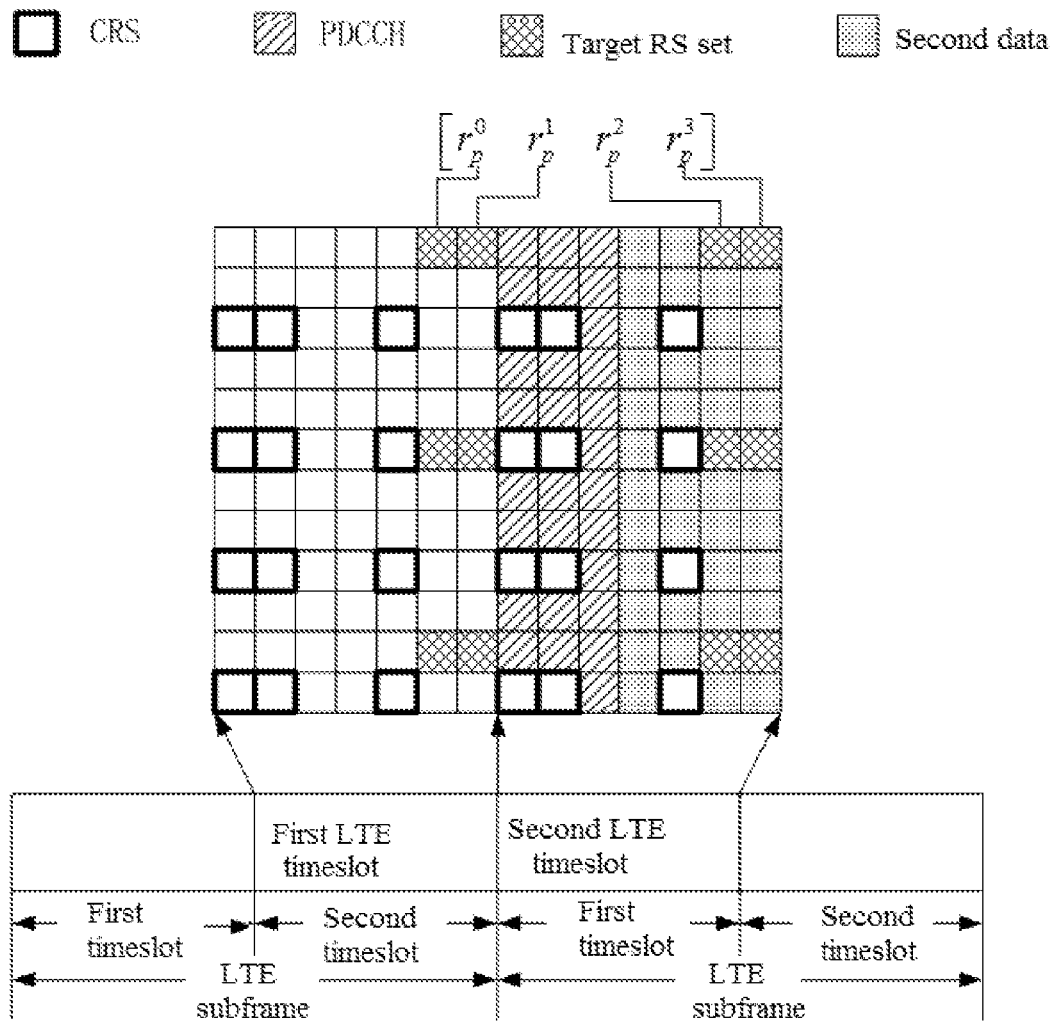
FIG. 3 is a diagram illustrating that a first LTE timeslot and a second LTE timeslot belong to two LTE subframes according to one embodiment of the disclosure.

Embodiment 3 gives an example of a diagram illustrating that a first LTE timeslot and a second LTE timeslot belong to two LTE subframes, as shown in FIG. 3. In FIG. 3, the first LTE timeslot is the second timeslot in an LTE subframe; the second LTE timeslot is the first timeslot in an LTE subframe. The squares marked by bold lines indicate REs occupied by a CRS, the squares filled by oblique lines indicate REs occupied by a PDCCH, the squares filled by cross lines indicates REs occupied by a target RS set, and the squares filled by black dots indicate REs occupied by a second data.

In Embodiment 3, the target RS set includes 2 LTE downlink URSs in the first LTE timeslot and the second LTE timeslot, the 2 LTE downlink URSs are the URS corresponding to antenna ports {7,8} respectively. The RS pattern of each RS in the 2 LTE downlink URSs is as marked by the cross lines in FIG. 3, the 2 LTE downlink URSs are distinguished through an OCC having a length of 2. The RS sequence of the 2 RSs reuses the RS sequence of the LTE downlink URS (since the first LTE timeslot and the second LTE timeslot belong to different LTE subframes, the RS sequences in the first LTE timeslot and the second LTE timeslot are different), the corresponding OCC sequence is as shown by $[r_p^0\ r_p^1\ r_p^2\ r_p^3]$ in FIG. 3; for the antenna port {7}, $[r_p^0\ r_p^1\ r_p^2\ r_p^3]$ is [1 1 1 1]; for the antenna port {8}, $[r_p^0\ r_p^1\ r_p^2\ r_p^3]$ is [1 −1 1 −1].

Embodiment 4

Figure 4:
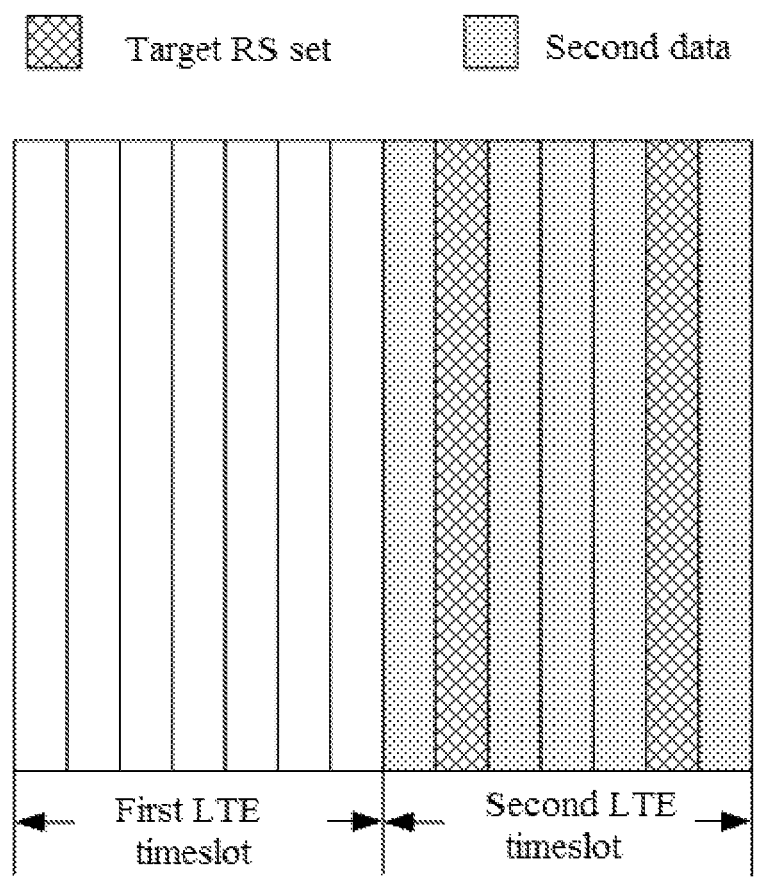
FIG. 4 is a diagram illustrating a second pattern in the uplink transmission according to one embodiment of the disclosure.

Embodiment 4 illustrates an example of a diagram for a second pattern in the uplink transmission, as shown in FIG. 4. In FIG. 4, the squares filled by cross lines indicate SC-FDMA symbols occupied by a target RS set, and the squares filled by black dots indicate SC-FDMA symbols occupied by a second data.

In Embodiment 4, the target RS is transmitted to the base station by the UE, the RS pattern of the target RS is a second pattern in the second LTE timeslot, the second pattern includes the second SC-FDMA symbol and the sixth SC-FDMA symbol in the second LTE timeslot.

Embodiment 5

Figure 5:
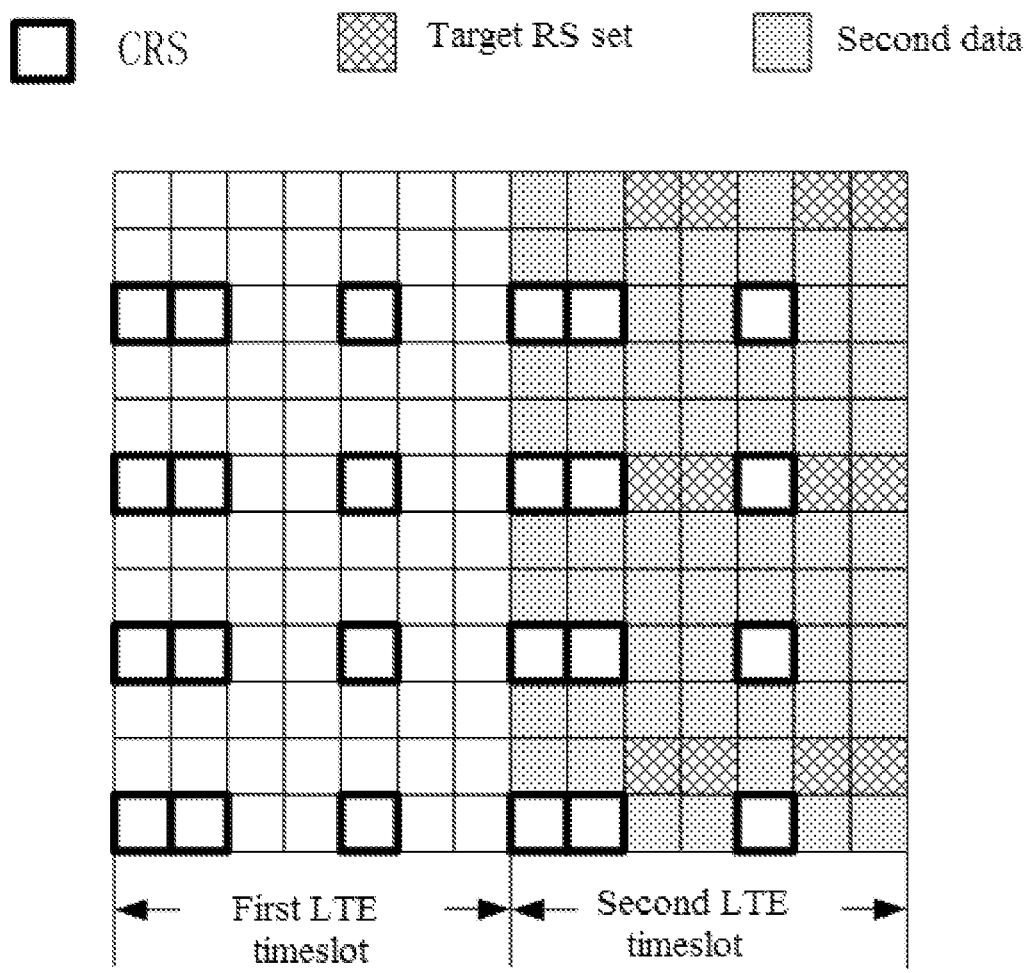
FIG. 5 is a diagram illustrating a second pattern in the downlink transmission according to one embodiment of the disclosure.

Embodiment 5 illustrates an example of a diagram for a second pattern in the downlink transmission, as shown in FIG. 5. In FIG. 5, the squares filled by cross lines indicate REs occupied by a target RS set, and the squares filled by black dots indicate REs occupied by a second data.

In Embodiment 5, the target RS is transmitted to the UE by the base station, the RS pattern of the target RS is a second pattern in the second LTE timeslot, and the second pattern is the RS pattern of the LTE downlink URS in the former 0.5 ms of a special subframe of a first configuration.

Embodiment 6

Figure 6:
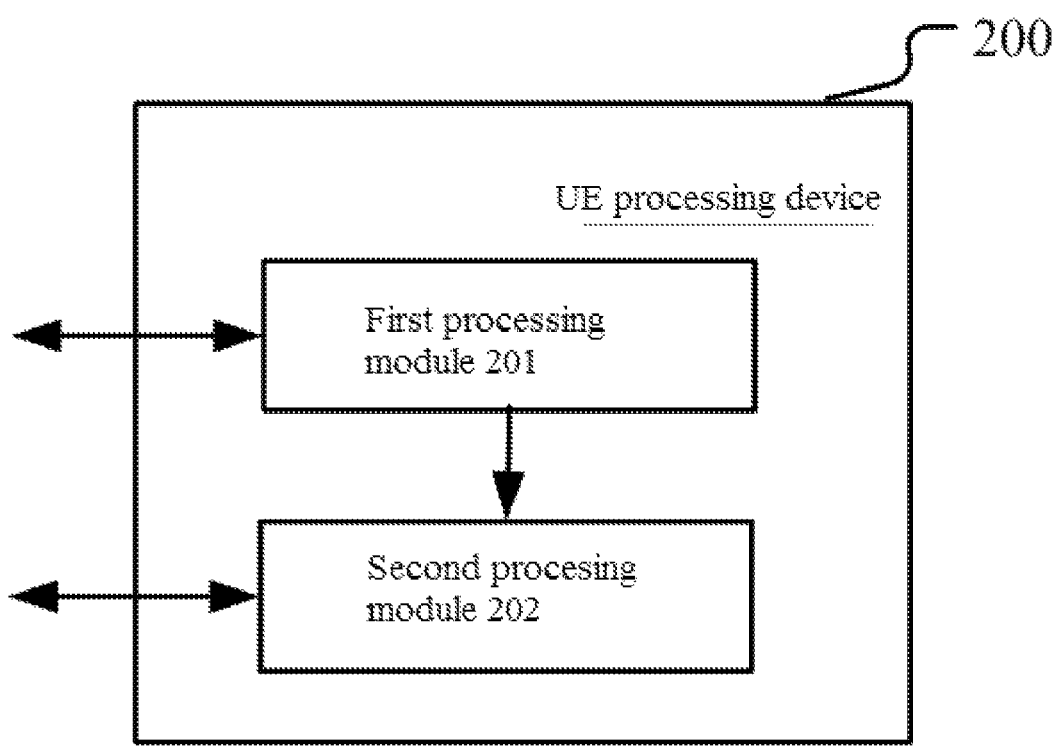
FIG. 6 is a structure diagram illustrating a processing device in a UE according to one embodiment of the disclosure.

Embodiment 6 illustrates an example of a structure diagram for a processing device in a UE, as shown in FIG. 6. In FIG. 6, a UE processing device 200 includes a first processing module 201 and a second processing module 202.

The first processing module 201 is configured to receive a first signaling, the first signaling indicating at least one of the following:

first information: whether a target RS set is transmitted in a first LTE timeslot;

second information: whether the RS pattern of the target RS set is a first pattern or a second pattern in a second LTE timeslot.

The second processing module 202 is configured to process the target RS set and a second data by a first operation in the second LTE timeslot according to the indication of the first signaling.

In Embodiment 6, the first signaling is a physical layer signaling, and the first signaling includes scheduling information of the second data. The target RS set includes P RSs, P being a positive integer, and the P RSs are respectively mapped to P antenna ports. The second data is transmitted by the P antenna ports. The second LTE timeslot is an LTE timeslot that is behind the first LTE timeslot and continuous with the first LTE timeslot. The first operation is receiving and the first pattern is the RS pattern of the LTE downlink URS in the LTE timeslot, or the first operation is transmitting and the first pattern is the RS pattern of the LTE uplink DMRS in the LTE timeslot. Compared with the first pattern, the second pattern includes more REs.

In one embodiment of Embodiment 6, the first processing module 201 is further configured to process the target RS set by the first operation in the first LTE timeslot. The second processing module 202 is further configured to estimate a parameter of a wireless channel through which the second data passes according to the target RS set received in the first LTE timeslot and the second LTE timeslot. Herein, the first operation is receiving, and the first information indicates that the target RS set is transmitted in the first LTE timeslot.

In one embodiment of Embodiment 6, the second processing module 202 is further configured to estimate a parameter of a wireless channel through which the second data passes according to the target RS set received in the second LTE timeslot. Herein, the first operation is receiving, the first information indicates that the target RS set is not transmitted in the first LTE timeslot, or the second information indicates that the RS pattern of the target RS set is the second pattern in the second LTE timeslot.

In one embodiment of Embodiment 6, the first processing module 201 includes a controller/processor 459, which is described in Embodiment 9.

In one embodiment of Embodiment 6, the first processing module 201 includes a receiving processor 456, which is described in Embodiment 9, a receiver 454, which is described in Embodiment 9, and an antenna 452, which is described in Embodiment 9.

In one embodiment of Embodiment 6, the second processing module 202 includes a receiving processor 456, which is described in Embodiment 9, a receiver 454, which is described in Embodiment 9, and an antenna 452, which is described in Embodiment 9.

In one embodiment 6 of Embodiment 6, the second processing module 202 includes a transmitting processor 468, which is described in Embodiment 9, a transmitter 454 in embodiment 9, and an antenna 452, which is described in Embodiment 9.

Embodiment 7

Figure 7:
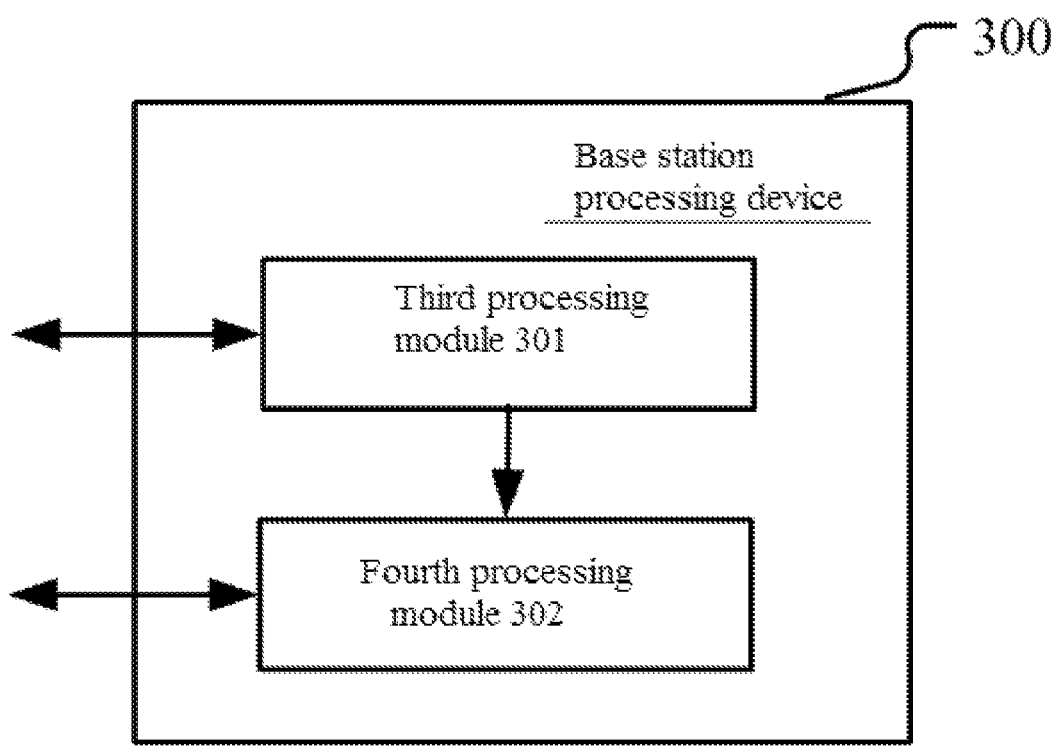
FIG. 7 is a structure diagram illustrating a processing device in a base station according to one embodiment of the disclosure.

Embodiment 7 illustrates an example of a structure diagram for a processing device in a base station, as shown in FIG. 7. In FIG. 7, a base station processing device 300 includes a third processing module 301 and a fourth processing module 302.

The third processing module 301 is configured to transmit a first signaling, the first signaling indicating at least one of the following:

first information: whether a target RS set is transmitted in a first LTE timeslot;

second information: whether the RS pattern of the target RS set is a first pattern or a second pattern in a second LTE timeslot.

The fourth processing module 302 is configured to process the target RS set and a second data by a second operation in the second LTE timeslot according to the indication of the first signaling.

In Embodiment 7, the target RS set includes P RSs, P being a positive integer, and the P RSs are respectively mapped to P antenna ports. The second data is transmitted by the P antenna ports. The second LTE timeslot is an LTE timeslot that is behind the first LTE timeslot and continuous with the first LTE timeslot. The second operation is transmitting and the first pattern is the RS pattern of the LTE downlink URS in the LTE timeslot, or the second operation is receiving and the first pattern is the RS pattern of the LTE uplink DMRS in the LTE timeslot. Compared with the first pattern, the second pattern includes more REs.

In one embodiment of Embodiment 7, the second operation is transmitting and the second pattern is the RS pattern of the LTE downlink URS in the former 0.5 ms of a special subframe of a first configuration.

In one embodiment of Embodiment 7, the second operation is receiving and the second pattern includes the second SC-FDMA symbol and the sixth SC-FDMA symbol in the second LTE timeslot.

In one embodiment of Embodiment 7, if the target RS set is transmitted in the first LTE timeslot, the RS pattern of the target RS set is the first pattern in the second LTE timeslot; otherwise, the RS pattern of the target RS set is the second pattern in the second LTE timeslot.

In one embodiment of Embodiment 7, P is a positive integer not greater than 2 (being greater than 2 probably may result in OCC having a length of 4, causing more incompatibility).

In one embodiment of Embodiment 7, the third processing module 301 includes a controller/processor 475, which is described in embodiment 9.

In one embodiment of Embodiment 7, the third processing module 301 includes a transmitting processor 416, which is described in Embodiment 9, a transmitter 418, which is described in Embodiment 9, and an antenna 420, which is described in Embodiment 9.

In one embodiment of Embodiment 7, the fourth processing module 302 includes transmitting processor 416, which is described in Embodiment 9, a transmitter 418, which is described in Embodiment 9, and an antenna 420, which is described in Embodiment 9.

In one embodiment of Embodiment 7, the fourth processing module 302 includes a receiving processor 470, which is described in Embodiment 9, a receiver 418, which is described in embodiment 9, and an antenna 420, which is described in Embodiment 9.

Embodiment 8

Figure 8:
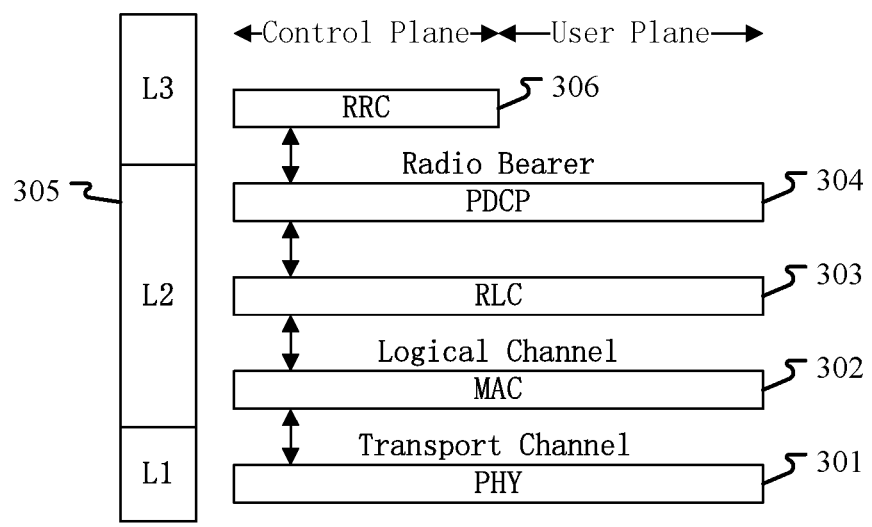
FIG. 8 is a structure diagram illustrating a radio protocol architecture of a user plane and a control plane.

Embodiment 8 is a structure diagram illustrating a radio protocol architecture of a user plane and a control plane, as shown in FIG. 8.

In FIG. 8, there are three layers: a L1 (layer 1) 301, a L2 (layer 2) 305 and a L3(layer 3) 306. The L1 301 is the lowest layer to process the physical layer signal. The L2 305 is above the L1 301, which is in charge of the link between a UE and a base station via the L1 301. In the user plane, L2 305 includes a MAC (Medium Access Control) 302 sublayer, a RLC (Radio Link Control) 303 sublayer, and a PDCP (Packet Data Convergence Protocol) 304 sublayer. All the three sublayers end at the base station of the network side. Although not described in FIG. 8, the UE may include several higher layers above the L2 305, such as network layer ending at a P-GW213 and a application layer ending at the other side of the linkage (i.e. a peer UE, a server, etc.). The PDCP 304 sublayer provides the multiplexing among variable radio bearers and logical channels. The PDCP 304 also provides a header compression for a higher layer data packet so as to reduce a radio transmission overhead. The PDCP 304 also provides security via encrypting a data packet and provides UE handover between two base stations. The RLC 303 provides segmentation and reassembling of a higher layer data packet, retransmission of a lost data packet, reordering of a lost data packet. The MAC 302 provides the multiplexing between logical channels and transport channels. The MAC 302 may allocating radio resource (i.e., resource block) for the UE and HARQ operation.

In the control plane, a radio protocol architecture of a UE is almost the same as a radio protocol architecture of a base station for L1 301 and L2 305. The control plane also includes L3 (layer 3) 306, i.e., RRC (Radio Resource Control) sublayer. The L3 306 can schedule the radio resource via a RRC signaling.

In one embodiment, the radio protocol architecture in FIG. 8 is applicable for the UE of this invention.

In one embodiment, the radio protocol architecture in FIG. 8 is applicable for the base station of this invention.

Embodiment 9

Figure 9:
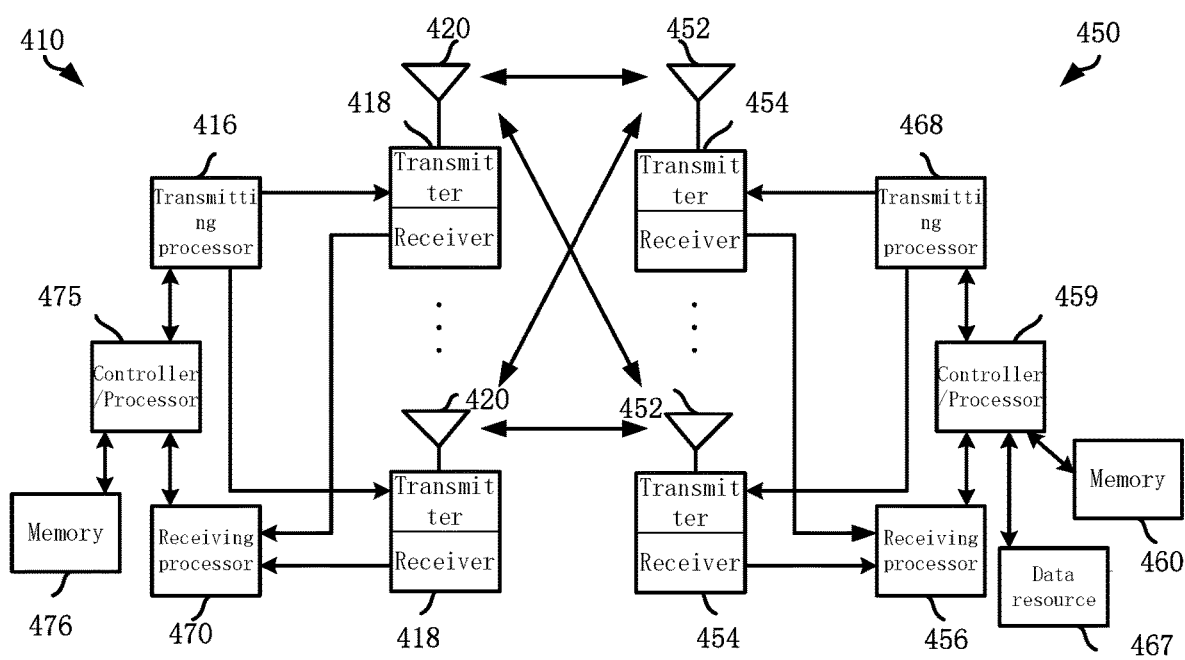
FIG. 9 is a structure diagram illustrating an architecture of a UE and an architecture of a base station in the access network.

Embodiment 9 is an illustration of a UE and base station, as shown in FIG. 9.

FIG. 9 describes a architecture of a UE 450 and a architecture of a base station 410 in the access network.

In downlink transmission, a packet from a higher layer is provided to a controller/processor 475. The controller/processor 475 provides a function of a layer 2. In downlink transmission, the controller/processor 475 provides header compression, encrypting, packet segmentation and reordering, multiplexing between logical channel and transport channel, and the resource allocation for the UE 450. The controller/processor 475 is in charge of HARQ operation, retransmission of the lost packet, and the signaling to the UE 450. A transmitting processor 416 performs a signal processing function used for a layer 1. The signal processing function includes encoding and interleaving so as to ensure a FEC (Forward Error Correction) and a demodulation corresponding to a modulation scheme (i.e., BPSK, QPSK, M-QAM, etc.) at the UE 450 side. The encoded and modulated signals are divided into parallel streams, which are then mapping into radio resources (i.e., a subcarrier, multiple subcarriers, multiple code channels, multiple Resource Elements, etc.). The parallel streams can be used to generate spatial streams via precoding. The spatial streams can go through transmitter 418 and be sent to multiple antennas 420. Every transmitter 418 is used to transmit a corresponding RF(Radio Frequency) carrier.

At the UE 450 side, every receiver 454 receives signal via a corresponding antenna 452. Every receiver 454 recovers information modulated to RF carrier and provides the information to a receiving processor 456. The receiving processor 456 performs the signal processing function for layer 1. The receiving processor 456 performs spatial processing on the information to recover any spatial stream targeting the UE 450. If there are multiple spatial streams are targeting the UE 450, the multiple spatial streams can be assembled into a single symbol stream by the receiving processor 456. The symbol stream can be recovered and demodulated via determining the most possible transmitting symbol set by the base station 410. The symbol stream is then decoded and deinterleaved so as to recover a original data and signaling transmitted by the base station 410. The original data and signaling is then provided to a controller/processor 459. The controller/processor 459 performs a layer 2 operation. The controller/processor 459 can be connected to a memory 460 that stores programme code and data. The memory 460 is computer readable. In downlink transmission, the controller/processor 459 provides the multiplexing between the transport channel and the logical channel, packet reassembling, decrypting, header decompression, and control signaling processing so as to recover a packet coming from the higher layer. The packet coming from the higher layer is then provided to the higher layers above layer 2, or the control signaling is provided to layer 3 for processing. The controller/processor 459 can also perform error detection on a HARQ-ACK to support the HARQ operation.

In the uplink transmission, a data source 467 provides a packet from a higher layer to the controller/processor 459. The data source 467 illustrates all the protocol layers above layer 2. Similar as the function description of the base station 410 in downlink transmission, the controller/processor 459 provides a function of a layer 2 of control plane and user plane based on a resource allocation from the base station 410. In uplink transmission, the controller/processor 459 provides header compression, encrypting, packet segmentation and reordering, and multiplexing between logical channel and transport channel. The controller/processor 459 is in charge of HARQ operation, retransmission of the lost packet, and the signaling to the base station 410. A transmitting processor 468 selects suitable encoding and modulation schemes, and can generate a spatial stream. The spatial stream generated by the transmitting processor 468 is provided to different transmitters, and then different antennas. Each transmitter 454 corresponds to a single antenna 452.

The base station 410 applies the similar manner to perform uplink reception as the UE 450 to perform the downlink reception.

Every receiver 418 receives signal via a corresponding antenna 420. Every receiver 418 recovers information modulated to RF carrier, and provide the information to a receiving processor 470. The receiving processor 470 can perform layer 1. A controller/processor 475 perform layer 2. The controller/processor 475 can be connected to a memory 476 that stores programme code and data. The memory 476 is computer readable. In uplink transmission, the controller/processor 476 provides the multiplexing between the transport channel and the logical channel, packet reassembling, decrypting, header decompression, and control signaling processing so as to recover a packet coming from the higher layer of the UE 450. The packet coming from the higher layer may be provided to the core network. The controller/processor 475 can also perform error detection on a HARQ-ACK to support the HARQ operation.

The ordinary skill in the art may understand that all or part steps in the above method may be implemented by instructing related hardware through a program; the program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. This application is not limited to any combination of hardware and software in specific forms. The UE in the disclosure includes but not limited to mobile phones, tablet computers, notebooks, Internet cards, vehicle communication equipment and other wireless communication equipment. The base station in the disclosure includes but not limited to macro-cellular base stations, micro-cellular base stations, home base stations, relay base station and wireless communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) supporting low-latency wireless communication, comprising:
   receiving a first signaling, the first signaling indicating at least: first information: whether a target Reference Signal (RS) set is transmitted in a first Long Term Evolution (LTE) timeslot;
   according to the indication of the first signaling, receiving the target RS set and a second data in the second LTE timeslot;
   according to the target RS set received in the second LTE timeslot, estimating a parameter of a wireless channel through which the second data passes; wherein:
   the target RS set comprises P RSs, P being a positive integer, and the P RSs are respectively mapped to P antenna ports;
   the second data is transmitted by the P antenna ports;
   the second LTE timeslot is an LTE timeslot that is behind the first LTE timeslot and continuous with the first LTE timeslot;
   the first information indicates that the target RS set is not transmitted in the first LTE timeslot;
   a physical layer channel occupied by the second data is mapped to a Downlink Shared Channel;
   the second data occupies K1 OFDM symbols in the second LTE timeslot;
   the second LTE timeslot includes K2 OFDM symbols;
   K1 is a positive integer less than K2; and
   K2 is a positive integer.

2. The method in a UE supporting low-latency wireless communication according to claim 1, wherein the first LTE timeslot and the second LTE timeslot belong to the same LTE subframe, or, the first LTE time slot and the second LTE timeslot belong to different LTE subframes.

3. The method in a UE supporting low-latency wireless communication according to claim 1, wherein the first information is indicated by one bit in the first signaling.

4. The method in a UE supporting low-latency wireless communication according to claim 1, wherein the target RS set is UE specific, or, the first signaling includes scheduling information of the second data.

5. A method in a base station supporting low-latency wireless communication, comprising:
transmitting a first signaling, the first signaling indicating at least one of the following: first information: whether a target RS set is transmitted in a first LTE timeslot;
according to the indication of the first signaling, transmitting the target RS set and a second data in the second LTE timeslot;
determining a modulation coding mode of the second data according to the following assumptions: a target UE estimates a parameter of a wireless channel through which the second data passes according to the target RS set received in the second LTE timeslot; wherein:
the target RS set comprises P RSs, P being a positive integer, and the P RSs are respectively mapped to P antenna ports;
the second data is transmitted by the P antenna ports;
the second LTE timeslot is an LTE timeslot that is behind the first LTE timeslot and continuous with the first LTE timeslot;
the first information indicates that the target RS set is not transmitted in the first LTE timeslot;
the target UE is a receiving UE of the target RS set;
a physical layer channel occupied by the second data is mapped to a Downlink Shared Channel;
the second data occupies K1 OFDM symbols in the second LTE timeslot;
the second LTE timeslot includes K2 OFDM symbols;
K1 is a positive integer less than K2; and
K2 is a positive integer.

6. The method in a base station supporting low-latency wireless communication according to claim 5, wherein the first LTE timeslot and the second LTE timeslot belong to the same LTE subframe, or, the first LTE timeslot and the second LTE timeslot belong to different LTE subframes.

7. The method in a base station supporting low-latency wireless communication according to claim 5, wherein the first information is indicated by one bit in the first signaling.

8. The method in a base station supporting low-latency wireless communication according to claim 5, wherein the target RS set is LIE specific, or, the first signaling includes scheduling information of the second data.

9. A UE supporting low-latency wireless communication, comprising:
a first module, receiving a first signaling, the first signaling indicating at least: first information: whether a target RS set is transmitted in a first LTE timeslot;
a second module, receiving the target RS set and a second data in the second LTE timeslot according to the indication of the first signaling, and according to the target RS set received in the second LTE timeslot, estimating a parameter of a wireless channel through which the second data passes; wherein:
the target RS set comprises P RSs, P being a positive integer, and the P RSs are respectively mapped to P antenna ports; the second data is transmitted by the P antenna ports;
the second LTE timeslot is an LTE timeslot that is behind the first LTE timeslot and continuous with the first LTE timeslot;
the first information indicates that the target RS set is not transmitted in the first LTE timeslot;
a physical layer channel occupied by the second data is mapped to a Downlink Shared Channel;
the second data occupies K1 OFDM symbols in the second LTE timeslot;
the second LTE timeslot includes K2 OFDM symbols;
K1 is a positive integer less than K2; and
K2 is a positive integer.

10. The UE supporting low-latency wireless communication according to claim 9, wherein the first LTE timeslot and the second LTE timeslot belong to the same LTE subframe, or, the first LTE timeslot and the second LTE timeslot belong to different LTE subframes.

11. A base station apparatus supporting low-latency wireless communication, comprising:
a first module, transmitting a first signaling, the first signaling indicating at least: first information: whether a target RS set is transmitted in a first LTE timeslot;
a second module, transmitting the target RS set and a second data in the second LTE timeslot according to the indication of the first signaling, and determining a modulation coding mode of the second data according to the following assumptions:
a target UE estimates a parameter of a wireless channel through which the second data passes according to the target RS set received in the second LTE timeslot; wherein:
the target RS set comprises P RSs, P being a positive integer, and the P RSs are respectively mapped to P antenna ports; the second data is transmitted by the P antenna ports;
the second LTE timeslot is an LTE timeslot that is behind the first LTE timeslot and continuous with the first LTE timeslot;
the first information indicates that the target RS set is not transmitted in the first LTE timeslot;
the target UE is a receiving UE of the target RS set;
a physical layer channel occupied by the second data is mapped to a Downlink Shared Channel;
the second data occupies K1 OFDM symbols in the second LTE timeslot;
the second LTE timeslot includes K2 OFDM symbols;
K1 is a positive integer less than K2; and
K2 is a positive integer.

12. The base station apparatus supporting low-latency wireless communication according to claim 11, wherein the first LTE timeslot and the second LTE timeslot belong to the same LTE subframe, or, the first LTE timeslot and the second LTE timeslot belong to different LTE subframes.

13. The UE supporting low-latency wireless communication according to claim 9, wherein the target RS set is UE specific, or, the first signaling includes scheduling information of the second data.

14. The UE supporting low-latency wireless communication according to claim 9, wherein the first information is indicated by one bit in the first signaling.

15. The base station apparatus supporting low-latency wireless communication according to claim 11, wherein the target RS set is UE specific, or, the first signaling includes scheduling information of the second data.

16. The base station apparatus supporting low-latency wireless communication according to claim 11, wherein the first information is indicated by one bit in the first signaling.

\* \* \* \* \*